2,790,725

LOWERING THE VISCOSITY OF CEMENT SLURRY BY ADDITION OF $CO_2$ GAS

Duncan R. Williams, Laramie, Wyo., assignor to Monolith Portland Midwest Company, Los Angeles, Calif., a corporation of Nevada No Drawing. Application September 27, 1954, Serial No. 458,687

4 Claims. (Cl. 106—100)

The present invention relates to methods of preparing or treating aqueous slurries of inorganic hydrophilic solids of alkaline characteristics so as to improve, from an economic aspect, the solids content of such slurries, and so as to obtain favorable viscosity characteristics within such slurries.

The precise nature of the present invention is best illustrated with reference to one field where it finds extensive commercial possibilities. In the manufacture of Portland cement, various aqueous slurries of inorganic hydrophilic solids are obtained by wet grinding and other operations, and are pumped directly to large rotary kilns where such slurries are heat treated in order to remove all moisture and to form the solid matter present into cement clinker. It is exceedingly desirable, in order to reduce the quantity of heat employed in the firing operation, that such slurries contain as high a proportion of solids as possible; it is also necessary that the viscosity of these slurries be within certain limiting values so that they may be readily pumped. The solids content of these slurries and the viscosity are interrelated; and, in general, the higher the solids content of the slurry, the higher its viscosity. This direct relationship between these two factors can, according to the present invention, be altered so as to produce inorganic cement slurries having "pumpable" viscosities and comparatively high solids content.

It follows from the above discussion that an object of the present invention is to provide a method for treating cement slurries so that these slurries may have a high solids content, and yet possess viscosities within the range in which these slurries may be pumped. The instant invention is not, however, limited to this specific application. A broad general object of the invention is to provide methods by which any aqueous slurry containing inorganic hydrophilic solids having alkaline characteristics in an aqueous medium can be treated so as to either lower the viscosity of such slurry or to increase the solids content within such slurry while maintaining a substantially constant viscosity. Other applications for the present invention, outside of the cement field, are in the treatment of various clay slurries such as are employed in the ceramic industry, in the treatment of slurries such as the so-called "red mud" and "brown mud" slurries employed in and obtained from the production of alumina by the so-called "American Bayer process" from bauxite, and in pumping soil slurries from one location to another. Other industrial applications of the present invention undoubtedly will be apparent to those skilled in the art from this description.

The method of the present invention can be briefly summarized as involving the intermixture of carbon dioxide, water, and ground inorganic hydrophilic solids giving an alkaline reaction in water. This invention is, of course, more precisely summarized by the appended claims forming a part of this specification, and is best explained in detail by the remainder of this description.

The solids present within aqueous slurries which may be treated in accordance with the present invention in order to obtain the advantageous results previously indicated are all characterized by being hydrophilic in nature. The water-attracting tendency of these solids is, as the term "hydrophilic" implies, much more pronounced than the tendency of all solids to adsorb a thin film of water vapor upon their surfaces. The amount of water adsorbed on the surface of solid particles within slurries which may be treated in accordance with this invention obviously varies directly with the amount of the surface area of these solid particles. This surface area in turn is directly related to the size of the particles within these slurries. In general the more finely divided these solids, the easier it is to maintain them in suspension and the more effective the action of the method of the present invention. Particularly favorable results have been obtained with slurries in which at least 80% of the solid particles present pass a 200-mesh screen.

For reasons, which are probably connected with the amount of moisture which may be adsorbed upon the surface of finely divided solids, as indicated above, slurries containing an extremely high proportion of very finely divided particles tend to become viscous. Indeed, many of these slurries cannot be handled by standard pumping procedures because of their high viscosity. As previously indicated, such viscosity is related to the solids content of these slurries and may be reduced by increasing the proportion of moisture present. This is not advantageous for economic reasons as previously discussed.

This interrelationship between solids content, viscosity, and, to a slightly lesser extent, particle size within aqueous slurries is definitely related to the specific nature of the particles within these slurries. Certain materials which may be treated in accordance with the present invention, such as bentonite and other clays tending to swell or expand appreciably in water, are more apt to form low solid content, viscous solutions, than are other solids such as finely ground limestone or various so-called high-grade shales which may be treated in accordance with this disclosure. A wide variety of other substances falling between the completely swelling and the completely non-swelling classifications of materials can be employed with the invention. Included in such other materials are kaolin, marl, bauxite, commercial pottery and porcelain clays, drilling mud such as is employed in the oil industry, and related solids. The invention is particularly advantageous with calcareous, siliceous, and calcareosiliceous slurries.

When the solids suspended within aqueous slurries are of such a composition that the slurries containing these solids are alkaline in character, it is possible, in accordance with this invention, to neutralize the alkalinity by means of carbon dioxide gas so as to lower the pH of the slurry to within the range of from about pH 6 to about pH 6.5 or pH 7, where, according to the discovery of the present invention, a minimum viscosity for the slurry is obtained. When the pH of the slurry is adjusted to within this range, a maximum proportion of solids may be present within such an aqueous suspension. Obviously, it is possible to treat various slurries containing hydrophilic inorganic solids, which slurries are alkaline in character, so that they possess pH's outside of the specific range given, and still retain certain of the advantages of the instant invention.

It is not in general, however, preferred that the pH of the ultimate slurry treated in accordance with the method of this disclosure be less than about 6 inasmuch as when the pH is decreased below such a figure the amount of carbon dioxide held in chemical combination within the water decreases to a considerable extent; that is, any carbon dioxide added to a slurry so as to decrease its pH below about 6.0 tends to escape from this slurry in the manner in which the same gas escapes from a common acidic soft drink. It may be generally stated that the lower the pH of a slurry obtained by practicing the invention, up until the point where carbon dioxide tends to escape from such a slurry, the more advantageous are its properties from the point of view of viscosity and permissible solids content.

The effectiveness of the pH of a slurry was quite clearly demonstrated by grinding together a mixture of 10 parts by weight of common limestone and 30 parts by weight of low grade shale until 80% of the particles within the mixture passed a 200-mesh screen. The following table summarizes the properties of slurries containing 46% by weight of this ground rock mixture before and after $CO_2$ had been bubbled through it for period of 20 minutes:

*Table I*

| Designation | Sample No. | Percent $H_2O$ | pH | Viscosity in Counterpoises |
|---|---|---|---|---|
| As received | 1 | 54.0 | 12.3 | 9.0 |
| Treated | 1 | 54.0 | 6.3 | 2.5 |

The same rock mixture as in the preceding example was used to demonstrate how an increased proportion of solids could be present within a slurry having a substantially constant viscosity. The following table is presented giving the compositions of two different slurries, one treated with carbon dioxide gas for 20 minutes, and the other not treated with the gas, both of these slurries having approximately the same viscosity:

*Table II*

| Designation | Sample No. | Percent $H_2O$ | pH | Viscosity in Counterpoises |
|---|---|---|---|---|
| As received | 2 | 42.0 | 11.0 | 4.5 |
| Treated | 2 | 38.0 | 6.5 | 5.0 |

The actual invention has been effectively tested utilizing a cement mixture having a composition of:

| | Percent |
|---|---|
| Silica ($SiO_2$) | 14.50 |
| Iron ($Fe_2O_3$) | 1.76 |
| Alumina ($Al_2O_3$) | 3.67 |
| Calcium oxide (CaO) | 42.60 |
| Soda ($Na_2O$) | .13 |
| Potassium oxide ($K_2O$) | .33 |
| Magnesium oxide (MgO) | .40 |
| Loss on ignition | 36.61 |

The following table gives the properties of slurries containing different proportions of these solids before and after being treated with bubbles of carbon dioxide gas for a period of 20 minutes and over a period of up to 90 hours:

*Table III*

| Sample | Percent Moisture | Viscosity measured as counterpoise | | | |
|---|---|---|---|---|---|
| | | Initially | 24 hrs. | 48 hrs. | 90 hrs. |
| As received | 37.7 | 10 | | | |
| Do | 39.0 | 9.0 | | | |
| $CO_2$ for 20 min | 34.5 | 10 | 10 | | |
| Do | 36.0 | 9.5 | 7.8 | 8.0 | 10.0 |
| Do | 37.0 | 8.5 | 7.5 | 8.0 | 9.0 |
| Do | 38.0 | 7.0 | 6.8 | 7.3 | 8.0 |
| Do | 39.0 | 6.0 | 6.0 | 6.3 | 7.0 |
| Do | 40.0 | 5.5 | 5.0 | 5.3 | 5.5 |
| Do | 42.0 | 4.0 | 4.0 | 4.3 | 4.5 |

It is seen from this table that not only is it possible to increase the solids content of "pumpable" cement slurries in accordance with the invention, but it is possible to regulate the viscosity of these slurries to a substantial extent.

Many of the slurries employed in the preceding examples were agitated for varying periods with air in order to keep the solids present from settling out. This air agitation did not produce any material change in the pH or viscosity of the solids suspension indicating that the carbon dioxide present within these slurries was chemically fixed and could not be replaced by air.

In applying the instant invention on a commercial scale, a common cement mixture as indicated in connection with the preceding Table III was ground, forming a slurry, in an F. L. Smidth 7 ft. x 40 ft. unidan wet mill, to an average fineness as indicated in the following table, for a given period in the presence of air, and then subsequently the same mixture was ground forming a slurry in the same mill for a second period in the presence of flue gas containing 8% carbon dioxide. The following Table IV indicates that approximately a 2.9% reduction in the moisture content of the slurry produced by this operation was possible by employing the present invention:

*Table IV*

| | In the presence of air | In the presence of $CO_2$ or flue gas |
|---|---|---|
| Barrels ground | 5,804 | 7,612 |
| Rate ground (Barrels/hr.) | 106 | 118 |
| Average Moisture (percent) | 38.0 | 35.1 |
| Average Flow Reading (F. L. Smidth Flow Table) | 3.1 | 3.7 |
| Average Fineness (−200 mesh) | 83.4 | 83.1 |

It is seen from the foregoing that the instant invention can be carried out employing relatively impure carbon dioxide from a variety of sources including flue gas. Whether or not pure carbon dioxide should be used for any specific application will, of course, depend upon the economics involved as well as the possibility of contamination of an undesired category resulting from the presence of unwanted gas along with carbon dioxide.

It is possible with the instant invention to obtain the advantageous results by a number of different intermixing steps. One such step as described in the preceding example involves the grinding of solids in the presence of water and carbon dioxide in the production of a slurry. Another procedure which for many applications will be exceedingly advantageous is to employ a carbon dioxide or a gas containing carbon dioxide to agitate a given slurry by bubbling this gas upward through the slurry from an appropriate conventional diffuser.

It is also possible to obtain advantages of the present invention by saturating water with carbon dioxide and then using the so saturated water in the formation of a slurry. As an example of this use of the invention, the following Table V is given showing the percentages of moisture and pH of two different slurries having the same viscosity, formed by grinding cement solids such as are indicated in the analysis given in the preceding discussion, in the presence of tap water at Laramie, Wyoming, and in the presence of the same water saturated with carbon dioxide.

*Table V*

| | Normal Water | Carbonated Water |
|---|---|---|
| Percent Moisture | 39.5 | 32.5 |
| pH | 11.3 | 7.0 |
| Viscosity | 2.6 | 2.6 |

In carrying out the present invention in this manner, it is necessary that the water employed be initially alkaline in character in order that a substantial quantity of carbon dioxide may be held within it. As will be realized by those skilled in the art, the bubbling of carbon dioxide gas through water having alkaline characteristics lowers the pH of such water towards the acid range. When the pH reaches this acid range, the water is substantially incapable of absorbing further carbon dioxide and tends to give up carbon dioxide held within it in the manner in which a common carbonated soft drink bubbles.

Those skilled in the art will realize that the herein described invention is capable of wide modifications within the scope of the instant disclosure. Such modifications are to be considered as part of the inventive concept insofar as they are defined by the appended claims. As an example of such modification, the instant invention can be employed in conjunction with conventional wetting agents in the control of the viscosity of various slurries as indicated.

I claim as my invention:

1. In a process of making Portland cement in which a water slurry is formed and then heated so as to form a cement clinker, the step which comprises forming a mixture of finely divided inorganic hydrophilic solids containing a major proportion of calcium carbonate, water and $CO_2$, said $CO_2$ being present therein in a sufficient quantity so as to lower the pH of said slurry to between about 6 and 7 thereby producing a slurry having a reduced viscosity in the absence of a wetting agent.

2. A process as defined in claim 1 wherein said mixture is formed by bubbling $CO_2$ into a slurry of said solids and water.

3. A process as defined in claim 1 wherein said water is alkaline, and wherein said water is saturated with $CO_2$, and wherein said mixture is formed by grinding said solids in the presence of said water saturated with $CO_2$.

4. A process as defined in claim 1 wherein said mixture is formed by grinding said solids in the presence of water and in the presence of $CO_2$ gas.

References Cited in the file of this patent

UNITED STATES PATENTS

| Number | Name | Date |
|---|---|---|
| 983,521 | Tornyay-Schosberger | Feb. 7, 1911 |
| 1,126,085 | Rusager | Jan. 26, 1915 |
| 1,242,236 | Pontoppidan | Oct. 9, 1917 |
| 1,688,882 | Schmidt | Oct. 23, 1928 |
| 1,846,347 | Meyers | Feb. 23, 1932 |
| 1,870,372 | Maust | Aug. 9, 1932 |
| 2,111,517 | Vogel-Jorgensen | Mar. 15, 1938 |
| 2,162,525 | Breerwood | June 13, 1939 |
| 2,164,871 | Eichenlaub | July 4, 1939 |
| 2,286,420 | Jackson | June 16, 1942 |
| 2,329,940 | Ponzer | Sept. 21, 1943 |
| 2,390,225 | Sherman et al. | Dec. 4, 1945 |
| 2,587,044 | Heilmann | Feb. 26, 1952 |

FOREIGN PATENTS

| 439,198 | Great Britain | Dec. 2, 1935 |
|---|---|---|

OTHER REFERENCES

Audley, "Silica and the Silicates," New York, Van Nostrand, 1923, p. 172.

Koyanagi, "Viscosity of Cement Slurry," Rock Products, vol. 36, #12, Dec. 25, 1933, pp. 30–33.

Lea and Desch, "Chemistry of Cement and Concrete," London, Arnold & Co., 1935, pp. 28 and 32.